(12) United States Patent
Emadi et al.

(10) Patent No.: US 12,535,560 B2
(45) Date of Patent: Jan. 27, 2026

(54) ADVANCED ADAPTIVE CLUSTERING TECHNIQUE FOR PORTABLE RADARS

(71) Applicant: Zadar Labs, Inc, Santa Clara, CA (US)

(72) Inventors: Mohammad Emadi, San Jose, CA (US); Mahmoud Saadat, San Jose, CA (US); Ali Mostajeran, Morgan Hill, CA (US)

(73) Assignee: Zadar Labs, Inc., Campbell, CA (US)

( * ) Notice: Subject to any disclaimer, the term of this patent is extended or adjusted under 35 U.S.C. 154(b) by 355 days.

(21) Appl. No.: 18/308,426

(22) Filed: Apr. 27, 2023

(65) Prior Publication Data
US 2023/0350019 A1 Nov. 2, 2023

Related U.S. Application Data

(60) Provisional application No. 63/363,752, filed on Apr. 28, 2022.

(51) Int. Cl.
H04W 4/02 (2018.01)
G01S 5/02 (2010.01)
G01S 7/41 (2006.01)
G01S 7/48 (2006.01)
H04W 64/00 (2009.01)

(52) U.S. Cl.
CPC .............. G01S 7/414 (2013.01); G01S 7/415 (2013.01); G01S 7/4802 (2013.01)

(58) Field of Classification Search
CPC ........ G01S 7/414; G01S 13/931; G01S 7/415; G01S 7/4802; G01S 13/42; G01S 13/726
USPC ...................................................... 455/456.1
See application file for complete search history.

(56) References Cited

U.S. PATENT DOCUMENTS

| 2009/0146842 | A1* | 6/2009 | Jung | G01S 17/42 340/932.2 |
| 2019/0391250 | A1* | 12/2019 | Cohen | G01S 13/87 |
| 2021/0256321 | A1* | 8/2021 | Gerardo | G06F 18/23 |
| 2022/0317302 | A1* | 10/2022 | Slobodyanyuk | G05D 1/0242 |

(Continued)

OTHER PUBLICATIONS

IP.com search history (Year: 2025).*

Primary Examiner — Moustapha Diaby
(74) Attorney, Agent, or Firm — UTULAW PC

(57) ABSTRACT

Disclosed herein are systems and methods for adaptive clustering of points from radar scans, utilizing feedback information to define appropriate clustering gate sizes, and optimizing overall radar system performance in various scenarios and environments. Various approaches enable separation of over-clustered targets into multiple clusters by removing points whose distance from a weighted center exceeds a disparity threshold, and uniting under-clustered targets into a single cluster. Outlier points can be removed based on their SNR and Doppler relative to a median SNR and median Doppler of all points in the cluster. The optimal cluster center is identified based on variable weighting techniques that consider at least one dimension beyond spatial dimensions, such as Doppler information, signal-to-noise ratio information, environmental conditions, or system constraints. Adaptive gate sizing is performed to fine-tune clustering parameters based on feedback from various sources, such as target characteristics, environmental conditions, or system constraints, using previous scan data.

20 Claims, 11 Drawing Sheets

(56) References Cited

U.S. PATENT DOCUMENTS

2023/0184926 A1* 6/2023 Owechko ............ G01S 13/9027
2023/0280459 A1* 9/2023 Chang .................. G01S 13/426
                                                      342/146

* cited by examiner

ADVANCED ADAPTIVE CLUSTERING TECHNIQUE FOR PORTABLE RADARS

CROSS-REFERENCE TO RELATED APPLICATIONS

The present application claims priority to U.S. provisional application No. 63/363,752, filed Apr. 28, 2022, and entitled "ADVANCED ADAPTIVE CLUSTERING TECHNIQUE FOR PORTABLE RADARS," which is hereby incorporated herein in its entirety for all purposes.

BACKGROUND

Field of the Art

The present embodiments relate to radar systems. More specifically, the present embodiments relate to adaptive clustering methodologies employed in radar data processing for enhanced object-tracking capabilities.

Discussion of the State of the Art

Modern automotive radar systems often operate in complex environments characterized by ghost targets, multipath effects, and background clutter. These challenges may arise due to surrounding structures, such as buildings, signs, or large parked vehicles, or from a variety of target types, including small reflectors, large trucks, buses, walls, guard rails, and other unusual targets within the radar's field of view. The difficulties are exacerbated when the radar possesses high-resolution capabilities in range, angle, and/or Doppler.

Clustering radar data is a critical step in radar object detection. An efficient clustering system and method can help prevent over-clustering by distinguishing targets located in close proximity and avoid under-clustering by merging points belonging to a single large target. Additionally, it can identify and eliminate false targets such as ghost targets, shadow targets, mirror targets, random noise targets, and targets from grating lobes. A reliable clustering system and method can also determine the optimal center of the cluster, which is essential for stable target tracking.

Conventional clustering techniques, like density-based spatial clustering of applications with noise (DBSCAN) and K-means clustering, possess several shortcomings. In particular, they struggle to properly cluster points for accurate object detection in certain scenarios. These techniques often only consider spatial dimensions (e.g., x, y, and z coordinates), resulting in limitations in precise object detection, including the failure to prevent over-clustering and/or under-clustering. Another limitation is the inability to address a Doppler zero case, where no frequency shift is detected in a moving object despite the relative motion between the wave signal source (e.g., the object) and the detector. For instance, a vehicle moving perpendicular to the radar may exhibit a radial velocity of zero (e.g., zero Doppler), causing conventional techniques to over-cluster the vehicle and under-cluster the vehicle with background clutter.

In another example, if two targets, such as vehicles, are positioned close to each other with similar velocities, conventional clustering techniques may combine (e.g., over-cluster) them into a single cluster, inaccurately classifying them as a single object rather than two distinct objects.

Consequently, there is a need for improved techniques for clustering radar data for object detection.

SUMMARY

Systems and methods in accordance with various embodiments of the present invention address one or more of the aforementioned and other limitations experienced in conventional approaches to object detection in radar signal processing. In particular, the present invention describes approaches for accurately clustering points (e.g., spatial locations and associated attributes of detected objects) received from a radar, with each cluster corresponding to an object (e.g., a physical entity such as a vehicle, pedestrian, or other stationary or moving targets). These approaches involve adaptive clustering techniques that include over-clustering correction to identify and rectify over-clustered groups. In one embodiment, the adaptive clustering techniques are capable of segmenting clusters into an optimal number of segments, ensuring accurate representation of individual objects, even when they are closely situated or exhibit similar attributes. In various embodiments, the adaptive clustering techniques utilize the signal-to-noise ratio of the points and the Doppler information of the points to optimize clustering, enhancing the overall accuracy and reliability of the object detection process. In another embodiment, the adaptive clustering technique effectively removes outlier points to enhance the accuracy of the clustering output.

Embodiments of the present invention provide a variety of advantages that address the limitations of conventional radar object detection techniques. One notable advantage is the capability to correct or optimize the size of a cluster, allowing the invention to determine when points have been over-clustered and segment them into an appropriate number of clusters of suitable size. For example, points from separate targets that are located close to each other, such as two vehicles that are close to each other and have similar velocities, may be incorrectly combined into a single cluster by conventional clustering techniques. Approaches described herein result in more accurate object detection and efficient use of computing resources. For example, the size of the cluster may be larger than an allowable computer memory use or other compute resource. In an embodiment, the invention would determine that the cluster is too large (e.g., exceeds a size threshold) and segment it into N number of different clusters. The resulting N clusters can more accurately correspond to the targets (e.g., two clusters corresponding to the two vehicles) and therefore allow for the correct detection of two separate objects.

Additionally, the present invention mitigates the under-clustering of points by recognizing when points have been under-clustered and consolidating them into a single cluster. This accurately represents a single target, leading to improved object detection. Conventional techniques may fail to include all points corresponding to a single target into a single cluster. For example, a various components (e.g., body, wheels, etc.) of a vehicle may exhibit different velocities. Conventional clustering techniques may inaccurately cluster points from the vehicle into two clusters (e.g., one corresponding to the body and the other corresponding to the wheels), resulting in an incorrect detection of the vehicle as two separate objects.

Yet another benefit, the invention enhances the overall accuracy of the clustering output by removing outlier points, such as false targets such as ghost targets, shadow targets, mirror targets, random noise targets, targets from grating lobes, and so forth.

Approaches may also resolve zero Doppler cases, for example, where a vehicle is moving perpendicular to a radar but exhibits zero Doppler such that conventional object detection techniques would otherwise fail to detect the vehicle as one object, contributing to more reliable object detection.

Another significant advantage of the present invention is the ability to find the best center of a cluster by using variable weighting and considering non-spatial dimensions, such as Doppler, power, SNR, etc., in finding a cluster center. This enables stable target tracking and more accurate object detection compared to conventional techniques that only consider spatial dimensions (e.g., x, y, and z coordinates) to determine the center of a cluster, which can compromise object detection due to suboptimal center identification and utilization.

Yet another benefit of the invention is fine-tuning parameters of clustering algorithms by adaptively adjusting parameters, such as gate sizing, based on data from previous scans. This improvement in the clustering of points leads to enhanced overall object detection performance. Specifically, cluster parameters may be fine-tuned through adaptive gate sizing. Various gates, such as doppler gates, range gates, etc., may be adjusted in size, which adjusts which attributes of a point are emphasized or muted, which in turn affects how the points are clustered. Gate sizes may be adjusted based on data from previous scans.

Various other functions and advantages are described and suggested below as may be provided in accordance with the various embodiments.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 7:
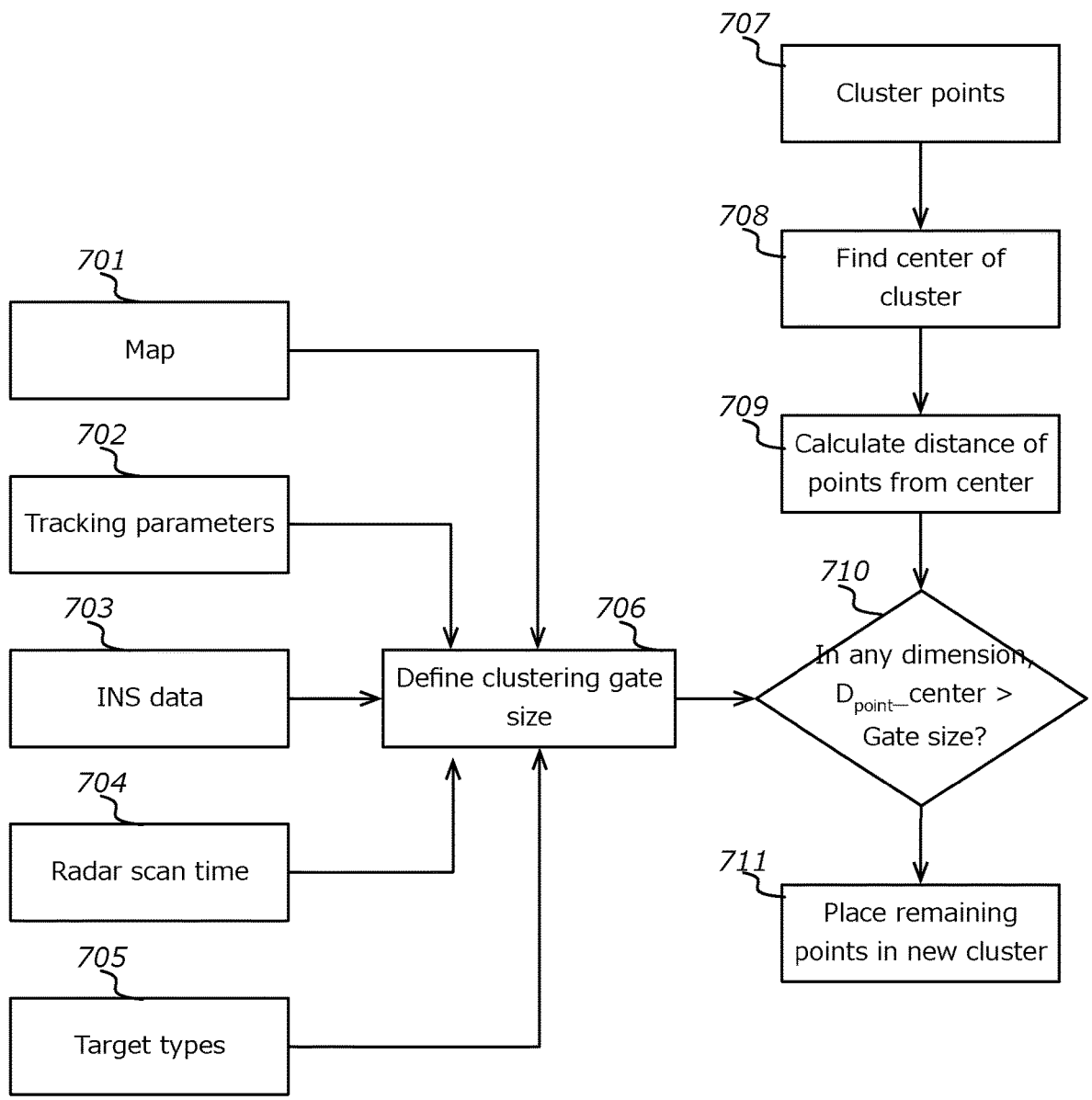

FIG. 7 an example flowchart of using adaptive gate sizing in clustering, in which aspects of the various embodiments can be implemented.

Figure 8:
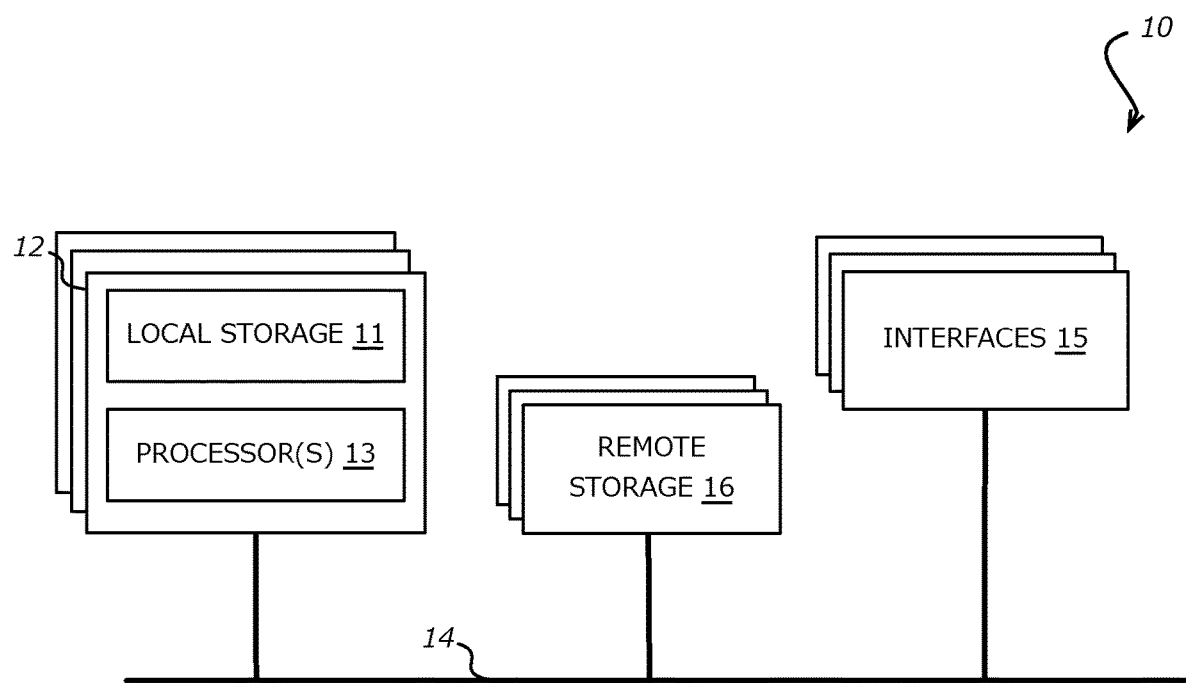

FIG. 8 illustrates components of a computing device that supports an embodiment of the present invention.

Figure 9:
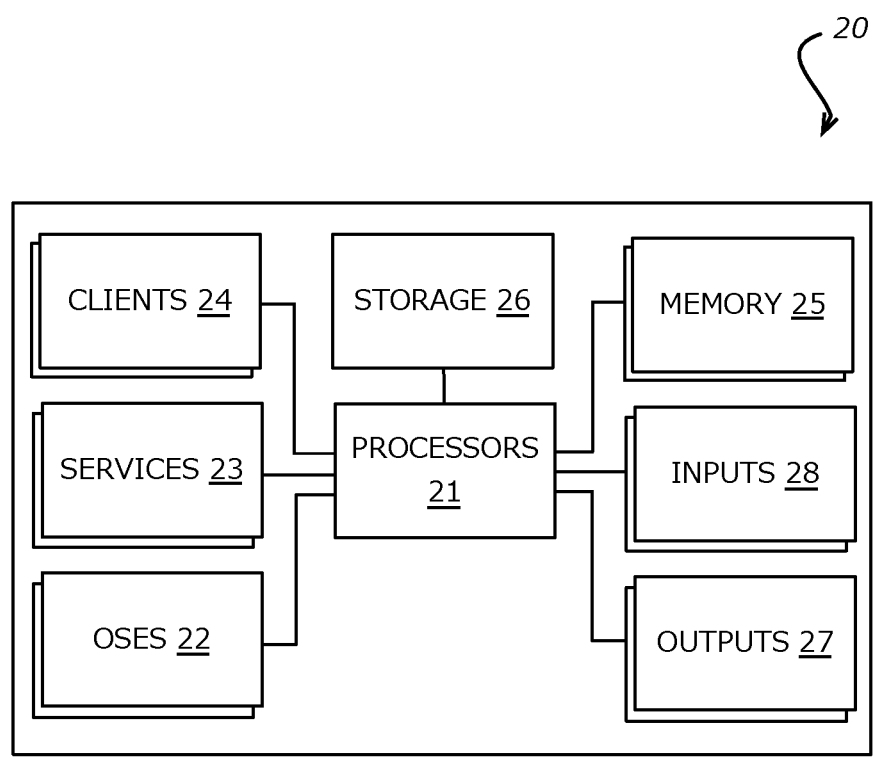

FIG. 9 illustrates an exemplary architecture of a system that supports an embodiment of the present invention.

Figure 10:
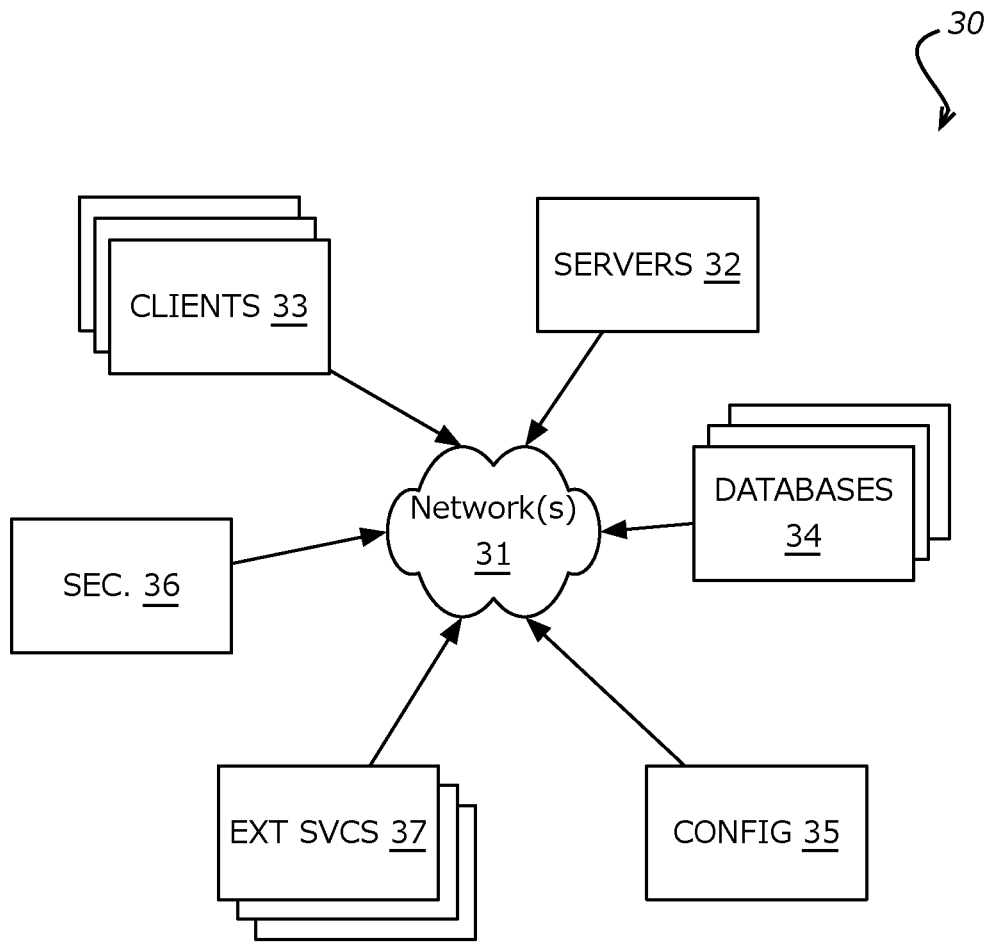

FIG. 10 illustrates another exemplary architecture of a system that supports an embodiment of the present invention.

Figure 11:
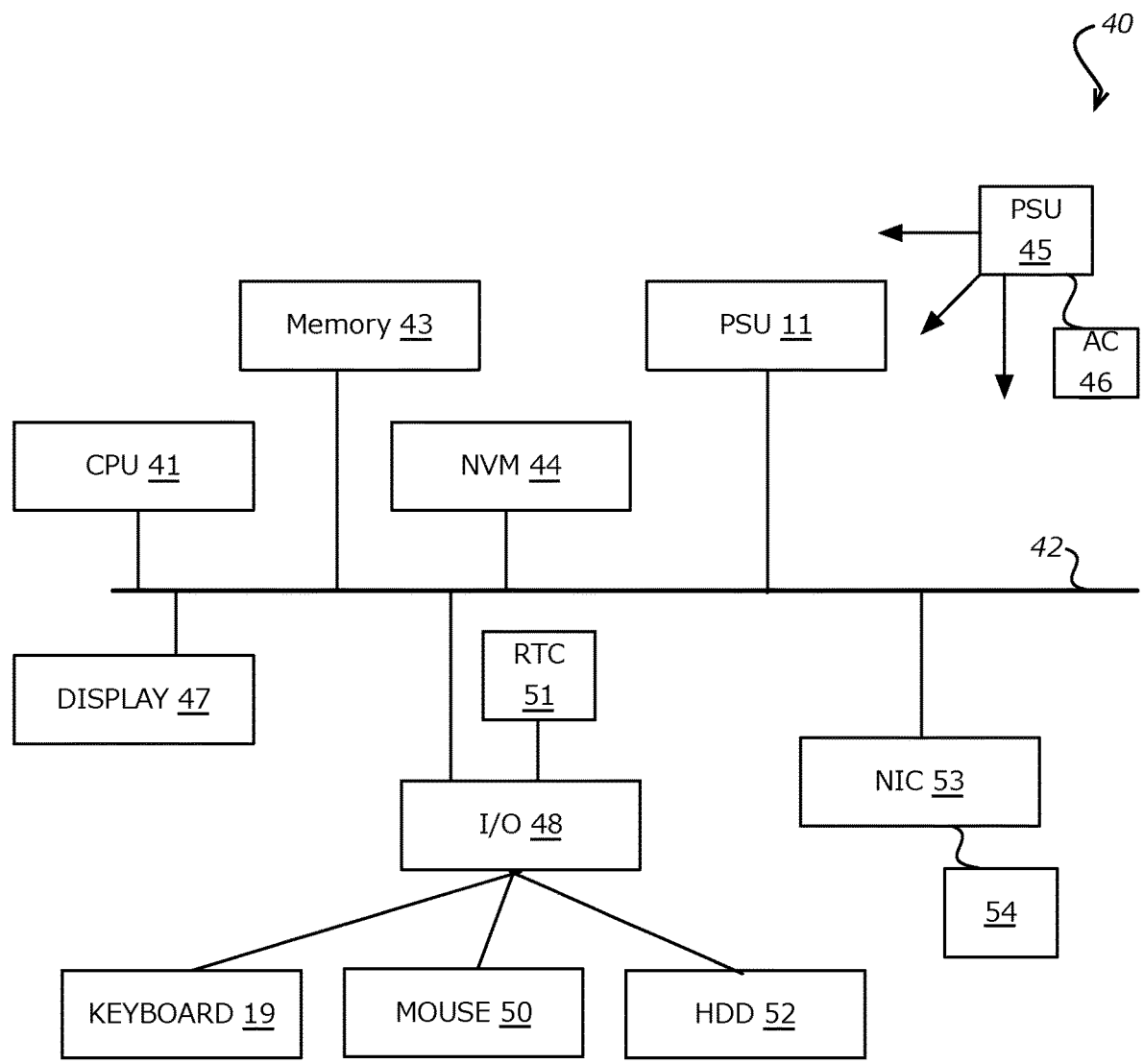

FIG. 11 illustrates components of a computer system that supports an embodiment of the present invention.

DETAILED DESCRIPTION

Figure 1:
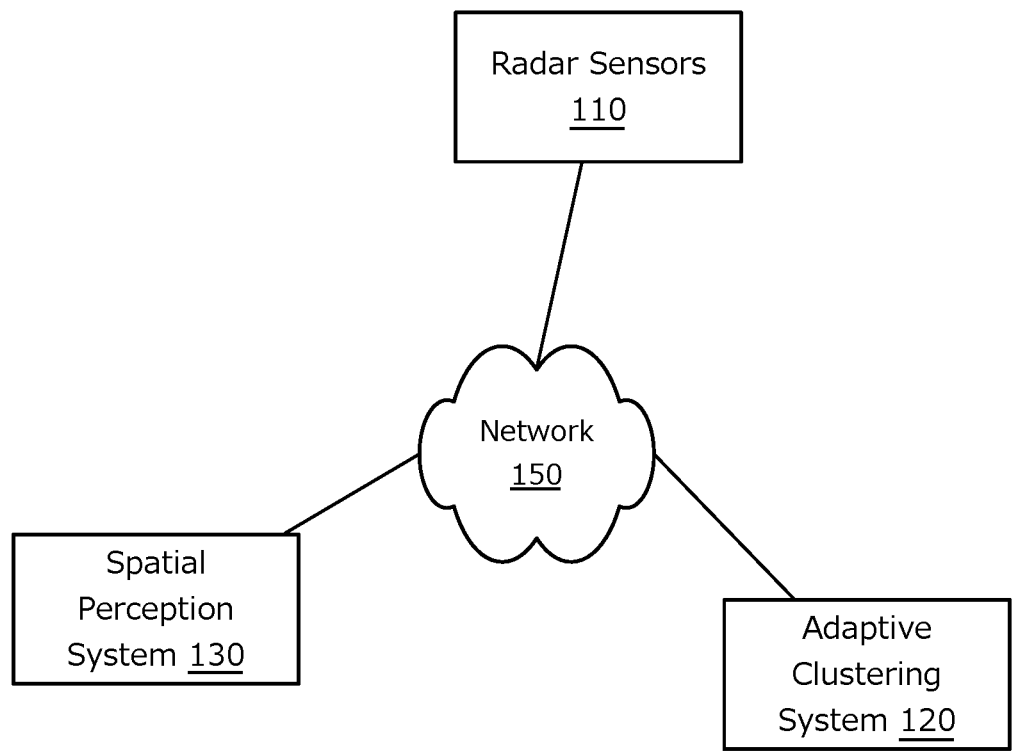
FIG. 1 illustrates an example environment in which aspects of the various embodiments can be implemented.

The approaches described herein relate to systems and methods for adaptive radar object detection and clustering. These approaches improve the accuracy and reliability of object detection by dynamically adjusting clustering parameters and considering various spatial and non-spatial dimensions. To provide a better understanding of the approaches and their various embodiments, FIG. 1 illustrates an example environment in which aspects of the various embodiments can be implemented.

It should be understood that reference numbers are carried over between figures for similar components for purposes of simplicity of explanation, but such usage should not be construed as a limitation on the various embodiments unless otherwise stated.

As shown, the environment may comprise radar sensors 110, adaptive clustering system 120, and spatial perception system 130. It should be noted that the various systems and components described herein are exemplary and for illustration purposes only. Radar sensors 110, adaptive clustering system 120, spatial perception system 130, and network 150 may be on a single system. In another embodiment, they may be on a distributed system. The components may be reorganized or consolidated, as understood by a person of ordinary skill in the art, to perform the same tasks on one or more other servers or devices without departing from the scope of the invention. Other components may be used, as would be readily understood by a person of ordinary skill in the art, without departing from the scope of the embodiments described herein.

Radar sensors 110 can gather signal data of objects within an environment, utilizing radar systems known in the art for receiving radar signals. In certain examples, radar systems include electronic devices designed to emit electromagnetic waves and analyze the signals that return after interacting with objects in the surrounding environment. Radar sensors 110 may be used in automotive radar systems, where receiver antennas associated with automated driving systems collect signal data of objects in the vehicle's environment, such as other vehicles, pedestrians, and road signs. Other examples of radar sensors 110 may include weather radar systems used by meteorologists to detect precipitation and other weather phenomena, or military radar systems used for surveillance, reconnaissance, and target tracking.

The output of the radar sensors 110 is typically raw radar-produced data, which may include a large amount of noise and false targets that are not relevant to the intended target or objects of interest. This data may consist of various types of information about the detected objects, such as their distance, speed, direction of movement, size, shape, and radar cross-section. In some embodiments, the radar-produced data may include points (e.g., targets), each represented by a set of coordinates that describe its location in the radar scan frame, as well as other information such as its radar cross-section, doppler value, and range from the radar sensor.

The radar-generated data, including points corresponding to an object or noise in the environment, is processed by the adaptive clustering system 120 to improve object detection and reduce noise.

Figure 2:
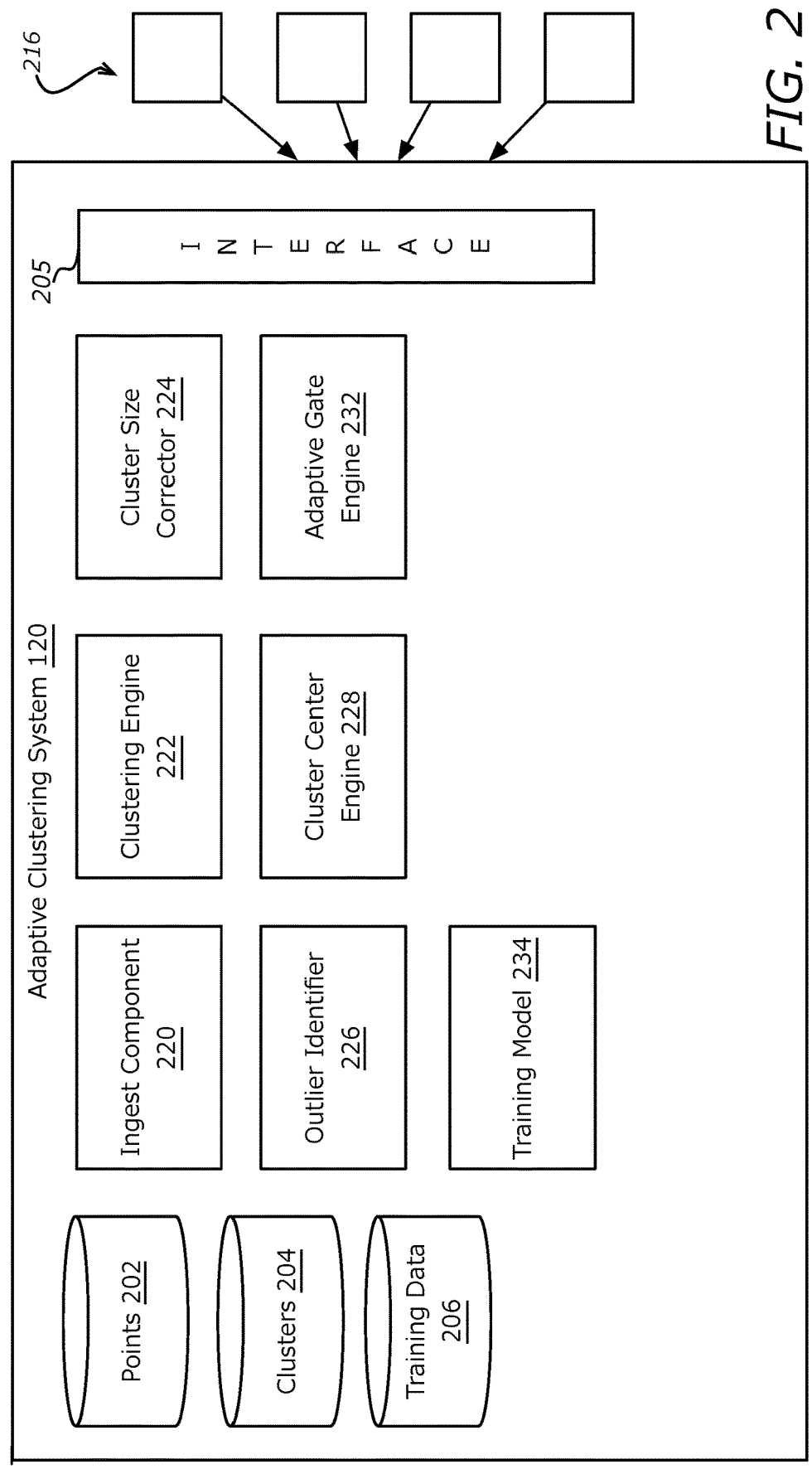
FIG. 2 illustrates an example of an adaptive clustering system in accordance with an exemplary embodiment.

Adaptive clustering system 120, described in greater detail in FIG. 2, improves the clustering of points derived from radar data. Adaptive clustering system 120 can correct cluster sizes, identify which points belong to specific clusters, determine the optimal center of a cluster, and adjust gate sizes to modify clustering parameters for more effective point clustering.

In one embodiment, the adaptive clustering system 120 can identify an over-clustered cluster and segment it into N number of appropriate clusters. In another embodiment, outlier points, such as those corresponding to false targets (e.g., noise) or points that should belong to a different cluster, are removed from the original cluster.

In another embodiment, the adaptive clustering system 120 mitigates under-clustering of points. Conventional clustering techniques may inaccurately identify a single object with multiple components, each exhibiting different velocities, as multiple objects by recognizing separate clusters for each component. In such cases, the clusters for each component are under-clustered and should be combined into a single cluster. The adaptive clustering system 120 may consider other factors, such as range, azimuth, elevation, etc., and/or apply weighting to these factors to determine that the multiple components belong to a single cluster.

In yet another embodiment, adaptive clustering system 120 can determine the optimal center for a cluster, allowing for stable target tracking. Adaptive clustering system 120 may use variable weighting, such as assigning different weights to various coordinates, dopplers, range, azimuth, elevation angles, etc., of points in a cluster to identify the optimal cluster center.

In an embodiment, the adaptive clustering system 120 can adjust gate sizes, fine-tuning clustering algorithm parameters to enhance point clustering. Various gates, including doppler gates and range gates, may be adjusted based on data from previous scans.

The spatial perception system 130 comprises systems that utilize detected objects based on correctly clustered points in radar signal processing. In one embodiment, the spatial perception system 130 may include autonomous vehicle perception systems or other driver assistance systems. In other embodiments, the spatial perception system 130 can encompass beamforming modules, systems utilizing angle of arrival estimation, among others. For instance, a beamforming module can select points from the clusters and process them in a round-robin manner.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. The present disclosure contemplates any suitable network 150. In an embodiment, adaptive clustering system 120 can be within a network (e.g., in communication with or associated with network 150). In another embodiment, adaptive clustering system 120 can be on the network edge (e.g., contained inside a radar sensor 110 which is in communication with network 150).

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

FIG. 2 illustrates an example of an adaptive clustering system 120 in accordance with an exemplary embodiment. It should be understood that reference numbers are carried over between figures for similar components for purposes of simplicity of explanation, but such usage should not be construed as a limitation on the various embodiments unless otherwise stated. It should be further known that the various components described herein are exemplary and for illustration purposes only. In this example, the adaptive clustering system 120 may comprise interface 205, input sources 216, ingest component 220, clustering engine 222, cluster size corrector 224, outlier identifier 226, cluster center engine 228, adaptive gate engine 232, and training model 234. Adaptive clustering system 120 may also include or be in communication with one or more data stores, including, for example, points data store 202, clusters data store 204, and training data store 206.

It should be noted that although the data stores are shown as separate data stores, data from the data stores can be maintained across fewer or additional data stores. The data stores can be accessed by each of the various components in order to perform the functionality of the corresponding component. Other components, systems, services, etc. may access the data stores. Although false adaptive clustering system 120 is shown as a single system, the system may be hosted on multiple server computers and/or distributed across multiple systems. Additionally, the components may be performed by any number of different computers and/or systems. Thus, the components may be separated into multiple services and/or over multiple disparate systems to perform the functionality described herein.

Points (e.g., targets) in an environment may be stored in points data store 202. In an embodiment, targets detected by radar systems can include various types of objects, such as aircraft, vehicles, ships, and pedestrians, among others. Points data store 202 can store information about the detected targets, including their position, velocity, size, and other properties. In certain embodiments, points data store 202 may store additional information about the detected points, such as the confidence level of the detection and any classification or identification information. In an embodiment, radar-produced data, such as from imaging radar sensors, can include detection of a plurality of points that are present in the environment within any given radar scan.

Various points may be grouped into clusters, based on a clustering algorithm. In an embodiment, the clustering algorithm can be a clustering algorithm as known in the art. In another embodiment, the clustering algorithm may be customized (e.g., parameters of the clustering algorithm may be fine-tuned) by adaptive gate sizing as described in further detail below.

Clusters data store 204 serves as a storage component for clusters that have been created based on the points collected from the environment. These clusters may have been formed using a standard or customized clustering algorithm, as previously described. The clusters data store 204 may store information related to each cluster, such as the points that belong to the cluster, the cluster's center, its size, and any additional attributes relevant to a specific application.

Training data can be stored in training data store 206, which can be utilized to train the training model 234 in order to learn to adjust gate sizes, such as doppler gates, range gates, and others, for the purpose of fine-tuning the parameters of a clustering algorithm and consequently refining the clustering of points. The training data can originate from various sources, including data from previous radar scans that provide a history of object detections and facilitate the identification of patterns or trends, map data that supplies contextual information about the environment such as road layouts, buildings, or other stationary objects, tracking parameters or tracking output that offers insights into the trajectories and characteristics of detected objects over time, Inertial Navigation System (INS) data that provides information on the position, velocity, and orientation of the radar system or the platform on which it is mounted, radar scan time that helps in analyzing the temporal aspects of the radar data, and target types that enable the training model to learn specific characteristics of different objects, such as vehicles, pedestrians, or other targets of interest.

The training data stored in training data store 206 can be used for various purposes, such as refining the clustering algorithm by adjusting gate sizes, enabling more accurate and efficient clustering of points, enhancing object detection and tracking capabilities by learning from the historical data and improving the system's ability to distinguish between valid targets and false targets or noise, and improving the overall performance and reliability of the radar system by providing a basis for continuous learning and adaptation to different operating conditions, environments, or target types.

Ingest component 220 is operable to receive, through interface 205, a selection of input sources 216 containing radar-produced data also referred to as radar data. In various embodiments, interface 205 can comprise a data interface and service interface configured to periodically receive datasets, requests, or any other relevant information related to radar-produced data, such as points (e.g., targets) collected from imaging radar sensors or radar antennas in an environment. Interface 205 may incorporate any suitable components known or utilized for receiving requests or data across a network, including one or more application programming interfaces (APIs) or other interfaces designed for receiving such requests and/or data. The input sources 216 can encompass a range of radar data sources, such as portable radar systems, radar antennas, configuration files containing radar data, and more. In some embodiments, radar data sources 216 may consist of multiple periodic radar scans of a specific environment, providing a comprehensive view of the surroundings for processing and analysis.

In accordance with an embodiment, multi-dimensional target attributes can refer to the various characteristics or properties of a target that are measured and recorded by a radar system in multiple dimensions. These attributes include, but are not limited to, the target's range, Doppler velocity, azimuth angle, elevation angle, and signal-to-noise ratio (SNR) information. In addition, other attributes such as target size, shape, and reflectivity can also be considered as multi-dimensional target attributes. In accordance with various embodiments, multi-dimensional refers the fact that these attributes are measured in multiple dimensions or directions, which enables a radar system to capture a completer and more detailed picture of the target.

Clustering engine 222 is operable to receive points, such as radar data, and group them into clusters. In an embodiment, points can be received through an ingest component (e.g., ingest component 220), which is responsible for acquiring radar-produced data from one or more input sources (e.g., input sources 216). The input sources, such as radar sensors or radar antennas, collect data on objects within the environment during radar scans, generating a set of points (e.g., targets) representing detected objects.

In one embodiment, points can be clustered using a clustering algorithm known in the art. For example, K-means clustering is a partitioning-based algorithm that assigns points to k clusters by minimizing the sum of squared distances between points and their assigned cluster centroids. Hierarchical clustering builds a tree-like structure of nested clusters by either successively merging smaller clusters (agglomerative hierarchical clustering) or splitting larger clusters (divisive hierarchical clustering).

Density-based clustering algorithms, such as DBSCAN (Density-Based Spatial Clustering of Applications with Noise) and OPTICS (Ordering Points to Identify the Clustering Structure), group points together based on their proximity and a predefined density threshold while identifying and excluding noise points. The OPTICS algorithm is capable of handling clusters with varying densities by building a cluster hierarchy.

Mean Shift clustering is a non-parametric, iterative algorithm that locates the centroids of clusters by shifting points towards the local mode of the underlying probability density function. Gaussian Mixture Models (GMM) represent clusters as a mixture of multiple Gaussian distributions, which can be estimated using the Expectation-Maximization (EM) algorithm.

Spectral clustering uses the eigenvectors of a similarity matrix derived from the input data to perform dimensionality reduction, followed by clustering in the lower-dimensional space using a method like K-means.

In another embodiment, the clustering algorithm may be customized, with parameters of the clustering algorithm fine-tuned through adaptive gate sizing, as described in further detail below. Points can be clustered based on various factors, including range, azimuth angle, elevation angle, doppler, etc. In yet another embodiment, points can be clustered considering a combination of spatial dimensions (e.g., spatial coordinates) and non-spatial dimensions, such as (x, y, z, doppler) or (x, y, z, azimuth). Each cluster may have a center, which could be a weighted cluster center (e.g., $a.C_0$), providing a focal point for analysis and processing.

Cluster size corrector 224 is operable to correct clusters that have been over-clustered or under-clustered. In an embodiments, cluster size corrector 224 compares the size of a cluster to a size threshold. For example, if the size of a cluster exceeds the size threshold, it may be an indication that the cluster has been over-clustered, containing points that should belong to separate, smaller clusters.

Conversely, if the size of a cluster is smaller than the size threshold, it may indicate that the cluster has been under-clustered, and points from different clusters should be merged to form a single, larger cluster. For example, typically, a target should have a single velocity. However, sometimes a target may include various components which have different velocities from each other. For example, a turning vehicle may exhibit a plurality of different velocities distributed across different points along the vehicle. The front of the car may exhibit a negative doppler, the middle a zero doppler, and the rear a positive doppler. Points corresponding to the vehicle may be grouped into three different clusters (e.g., one corresponding to the first velocity of the front of the vehicle, one corresponding to the second velocity of the middle of the vehicle, and one corresponding to the third velocity of the rear of the vehicle), and would therefore be under-clustered. Cluster size corrector 224 may determine that the three clusters are under-clustered and correct the under-clustering by uniting all points corresponding to the vehicle into a single cluster.

In an embodiment, the size threshold can be determined in various ways, such as using a predetermined value based on domain-specific knowledge, a value relative to the size of other nearby clusters, or based on clustering results from previous scans. For instance, if the average size of nearby clusters is different from a specific cluster's size, it may indicate over-clustering or under-clustering. Similarly, if the size of a cluster deviates from the size of a cluster in a similar position in previous scans, it may also indicate over-clustering or under-clustering.

In another embodiment, cluster size corrector 224 analyzes each point in a cluster by comparing its distance from the weighted center against a disparity threshold. For example, consider a cluster formed by a group of points, where each point represents a target detected by the radar. The weighted center of the cluster is a point that represents the central tendency of the points within the cluster, taking into account their individual weights, which could be based on factors such as signal strength, range, or other relevant attributes. If the distance is less than the disparity threshold, the point is determined to belong to the original cluster, as its position closely aligns with the other points in the cluster. If the distance between a point and the weighted center is greater than the disparity threshold, the point is considered to be an over-clustered point and is removed from the original cluster. This removal indicates that the point may belong to a separate cluster, as its position in the environment is significantly different from the other points in the original cluster. In an embodiment, the original cluster refers to the initial grouping of points before any adjustments are made by the cluster size corrector 224.

In accordance with an embodiment, when cluster size corrector 224 removes points from an original cluster due to them being over-clustered, these removed points may be analyzed further to form their own separate cluster(s). For example, consider a scenario where a radar detects two closely located vehicles, and the points representing these vehicles are initially grouped into a single cluster. The cluster size corrector 224 identifies that some points are over-clustered and removes them from the original cluster. Once these points have been removed, the cluster size corrector 224 can apply a clustering algorithm, such as k-means, DBSCAN, or hierarchical clustering, to the removed points to determine if they form their own distinct cluster(s). This analysis may involve computing the distances between the removed points, comparing them to a second disparity threshold, and grouping them based on their similarities in spatial or non-spatial dimensions, such as range, azimuth, elevation, or Doppler shift.

In certain embodiments, if the removed points exhibit a sufficient level of similarity, such as a threshold level of similarity, they may be grouped together to form a new cluster, which can be referred to as a second cluster. This second cluster will have its own weighted center, representing the central tendency of the points within the new cluster, taking into account their individual weights.

Outlier identifier 226 is configured to identify and remove outlier points from clusters. Outlier points may include points that should belong to a different cluster or correspond to noise, such as false targets or other data irregularities. In order to determine whether a point is an outlier, the outlier identifier 226 may employs a two-step process.

First, in one embodiment, outlier identifier 226 compares the Signal-to-Noise Ratio (SNR) of each point within a cluster to the median SNR of all points in the same cluster. If the difference between the point's SNR and the median SNR exceeds a predetermined SNR threshold, the outlier identifier 226 considers the point an outlier and removes it from the cluster.

Second, if the difference between the point's SNR and the median SNR is below the predetermined SNR threshold, the outlier identifier 226 proceeds to evaluate the Doppler shift associated with the point. It compares the sign of the point's Doppler shift with the sign of the median Doppler shift of all points within the cluster. If the signs do not match, the point is considered an outlier and is removed from the cluster.

The remaining points in the cluster after the removal of outliers constitute the corrected cluster.

Cluster center engine 228 is operable to determine a center of a cluster. In an embodiment, cluster center engine 228 may utilize variable weighting to find an appropriate center of a particular cluster and/or correct an inaccurate identification of a center. Weights may be given to various points based on spatial dimensions (e.g., x, y, z coordinates), non-spatial dimensions (e.g., doppler, snr, power, etc.), or a combination thereof. In an example, more weight may be given to points in a cluster which have a positive doppler and low range (e.g., close to the radar). This can help identify points that are more likely to be part of a moving object or target. In another example, more weight may be given to points which have a negative doppler and high range. This can help identify points that are likely to be part of a receding object or target. The weighted points may be used to calculate a weighted center (e.g., based on doppler and range). This weighted center may provide a more accurate representation of the actual center of the object or target, allowing for better tracking and data processing in various applications.

In an embodiment, data can be obtained identify weighting combinations. For example, consider the scenario of an autonomous vehicle equipped with a radar system for detecting and tracking surrounding objects. The radar system scans the environment and generates data points for detected objects, such as other vehicles, pedestrians, and obstacles. As the radar system collects data points, it also measures various attributes associated with each point, such as range, Doppler, SNR, power, and spatial coordinates (x, y, z). The adaptive clustering system takes this information as input and begins the clustering process. In this example, the adaptive clustering system implements the cluster center engine 228, which applies variable weighting based on the specific attributes of each point. For instance, points with a positive Doppler and low range are assigned more weight, indicating that they are more likely to be part of a moving object or target approaching the vehicle. Similarly, points with a negative Doppler and high range are assigned more weight, suggesting that they belong to a receding object or target. Using this weighted information, the cluster center engine 228 calculates a weighted center for each cluster. This weighted center considers factors like Doppler and range and provides a more accurate representation of the actual center of the object or target.

In an embodiment, the weighting process can be optimized. In an example, an iterative machine learning approach can be employed to optimize the weighting process in adaptive clustering systems. In this example, a dataset of radar-produced data is collected, covering various scenarios and environmental conditions. The data includes attributes such as range, Doppler, SNR, power, and spatial coordinates (x, y, z). The collected data is processed to extract relevant features for clustering, which may include spatial dimensions, non-spatial dimensions, or a combination thereof.

An appropriate machine learning model is selected for optimizing the weighting process, such as a supervised learning model like a regression model, or an unsupervised learning model like a clustering algorithm with an objective function incorporating the variable weighting. The dataset is divided into a training set and a validation set, and the model is trained using the extracted features and variable weighting. The model's performance is validated on the validation set to ensure generalization to unseen data.

Parameter tuning is performed using techniques like grid search, random search, or Bayesian optimization to fine-tune the model's learning rate, regularization term, or number of clusters, optimizing the performance of the weighting process. The machine learning model is continuously updated with new data points as they become available, allowing the model to learn from the latest data and adapt its weighting process accordingly.

Evaluations can be conducted to ensure the effectiveness of the optimized weighting process in different scenarios and conditions. This can be done by comparing the model's performance to ground truth data or benchmarking against other clustering algorithms.

Adaptive gate engine 232 is operable to adaptively change a gate size in clustering. Adjusting the gate size (e.g., doppler gate, range gate, etc.) can adjust the parameters of the clustering algorithm, thereby affecting how the points are clustered because different attributes of the points are emphasized or muted. Adaptive gate engine 232 improves clustering by adjusting gate sizes based on training data. In one embodiment, the training data comprises feedback obtained from the environment and/or previous data (from previous scans), which helps identify the appropriate gates to adjust. The feedback may include information such as environmental maps, tracking output, inertial navigation system (INS) data, radar scan time, target types, and more.

In some embodiments, training model 234 learns to fine-tune parameters of the clustering algorithm by adjusting gate sizes, which impacts how points are clustered. For instance, training model 234 may learn which gates (e.g., Doppler gate, azimuth gate, etc.) to adjust in subsequent radar scans based on the feedback (e.g., training data) from previous scans and knowledge of which gates were previously adjusted by adaptive gate engine 232. This adaptive approach enables the system to continuously improve clustering performance in different environments and scenarios, ultimately enhancing the capabilities of systems such as autonomous vehicles and radar-based tracking systems.

In an example use case for adaptive gate engine 232, radar data of an environment can be obtained and multiple points within a radar scan can be detected. The radar data can be obtained from an autonomous vehicle's radar system. The points can be clustered by a clustering engine using a clustering algorithm with predefined gate sizes for range, doppler, and azimuth attributes. As the vehicle navigates through different environments and scenarios, the system accumulates training data, which comprises feedback from previous radar scans, environmental map data, tracking output, inertial navigation system (INS) data, radar scan time, and target types. This training data can be stored in a training data store and is used by training model 234 to learn how to optimally adjust gate sizes. Upon analyzing the training data, adaptive gate engine 232 identifies specific gate sizes to be adjusted to improve the clustering performance. For example, it may determine that the range gate size needs to be reduced to better differentiate between closely spaced objects, while the doppler gate size needs to be increased to account for a wider range of velocities observed in the environment. Adaptive gate engine 232 then modifies the gate sizes in the clustering algorithm accordingly, and the updated clustering algorithm is applied to the incoming radar data.

Figure 3:
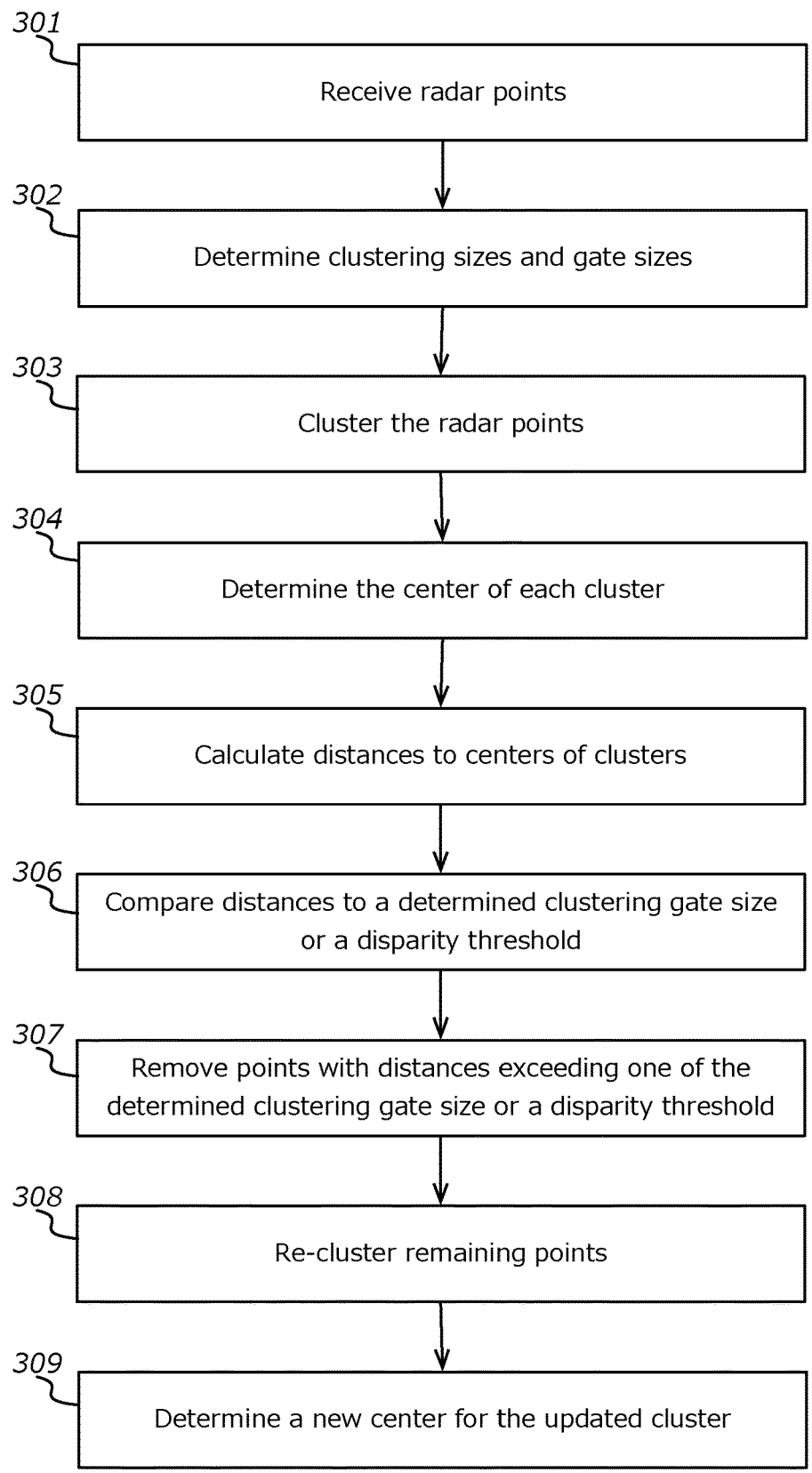
FIG. 3 illustrates an example process for adaptive clustering of points derived from radar data in accordance with various embodiments.

FIG. 3 illustrates an example process for adaptive clustering of points derived from radar data in accordance with various embodiments. In embodiments, the method steps or techniques depicted and described herein can be performed in a processor comprising one or more of adaptive clustering system 120 as illustrated in FIG. 1, the method steps being encoded as processor-executable instructions in a non-transitory memory of one or more computing devices. The techniques of FIG. 3 and other process steps described herein may be implemented in an operating system kernel, in a separate user process, in a library package bound into network applications, on a specially constructed machine, in an application-specific integrated circuit (ASIC), or a field programmable gate array (FPGA). The process may comprise additional steps, fewer steps, and/or a different order of steps without departing from the scope of the invention as would be apparent to one of ordinary skill in the art.

At step 301, receive radar points. For example, radar points can be received from a radar system that transmits electromagnetic signals and receives the reflected signals from various objects in the environment. These radar points can include information about the range, angle of arrival (azimuth and/or elevation), doppler, and signal-to-noise ratio (SNR) for each detected object.

At step 302, determine clustering gate sizes based on feedback information. In an embodiment, feedback information can comprise feedback from various sources (e.g., environmental map, tracking output, INS data, radar scan time, target types, target characteristics, environmental conditions, system constraints, etc.) Target characteristics comprise the physical attributes of targets that can affect their detectability and clustering. Some examples include size, shape, reflectivity, speed, and direction of movement. Environmental conditions comprise factors in the environment that can impact radar performance and clustering accuracy. Examples include weather conditions (e.g., rain, snow, fog), terrain characteristics (e.g., hills, buildings), and the presence of electromagnetic interference (EMI). System constraints comprise limitations of the radar system itself that can impact its performance and clustering accuracy. Examples include bandwidth limitations, power constraints, and processing speed limitations. Based on the feedback information, the process can define clustering gate sizes can be defined for range, azimuth, elevation, and/or doppler dimensions. Adaptive date sizing is described in further detail in at least FIG. 7.

At step 303, cluster the radar points. In an embodiment, the points can be clustered using the defined clustering gate sizes. In an embodiment, the points can be clustered using a connected graph with a minimum point requirement. For example, after defining the appropriate clustering gate sizes, points can be collected through the gates and can be clustered using a connected graph with a minimum point requirement. In an embodiment, a connected graph represents a set of points wherein each point is directly or indirectly connected to every other point in the set. The clustering can be performed using any suitable technique known in the art for finding connected components in a graph. Clustering the points based on clustered gate sizes and a connected graph is described in further detail in at least FIG. 7.

At step 304, determine the center of each cluster. In an embodiment, the center of each cluster can be determined using variable weighting techniques considering dimensions beyond spatial dimensions (e.g., azimuth, elevation, range, doppler). In an embodiment, the weighting techniques can be based on SNR-weighted values and other factors as described herein.

At step 305, calculate the distance between each point in the cluster and the determined center.

At step 306, compare the calculated distance to a determined clustering gate size or a disparity threshold, which are derived from the adaptive gate sizing process based on feedback information. In an embodiment, the disparity threshold is a predetermined threshold used to identify and remove outlier points from a cluster during the clustering process. The disparity threshold can be based on various factors, including the range, azimuth, and elevation of the points in the cluster, as well as their signal-to-noise ratio (SNR) and doppler value. Points that fall outside of the disparity threshold are considered to be inconsistent with the other points in the cluster and can be removed to improve the accuracy of the clustering. The specific value of the disparity threshold can be determined based on the characteristics of the radar system and the specific environment in which the system is operating. In an embodiment, the clustering gate size is a parameter used to define the size of the sample volume for each gate, such as range, azimuth, elevation, or doppler. It is used to specify the volume of space around each point within which other points will be grouped together to form a cluster. In an embodiment, calculating the distance between each point in the cluster is further described in FIG. 6.

At step 307, remove points with distances exceeding one of the determined clustering gate size or a disparity threshold. In various embodiments, the determination of which comparison to make depends on the specific implementation and goals of the radar system. In general, the comparison to a determined clustering gate size is used to identify outliers or points that are significantly farther from the center of their respective cluster than the other points in the cluster. This comparison can help to ensure that the clusters are not artificially inflated by points that do not truly belong to the cluster. The comparison to a disparity threshold is used to identify points that have significantly different characteristics compared to the other points in the cluster. This comparison can help to ensure that the clusters are homogeneous and contain points that are similar to each other in terms of their characteristics. In an embodiment, the distance calculation can be based on the weighted center and the additional dimensions taken into account during the clustering process.

At step 308, the remaining points that were not removed in the previous step are re-clustered into a new cluster. This re-clustering process involves creating a new cluster for the remaining points that have not been removed. The new cluster may have a different center than the previous cluster and may have a different number of points than the original cluster. The new cluster may be created using the same or a different clustering technique as the original cluster. as described in further detail in FIG. 6.

At step 309, after the points in a cluster have been re-clustered, a new center for the updated clusters is determined. The new center is then used in conjunction with adaptive gate sizing, variable weighting, and feedback mechanisms to optimize the overall performance of the radar system in various scenarios and environments. For example, in a scenario where the radar system is tracking a fast-moving target, the adaptive gate sizing can be used to adjust the clustering parameters to enable the system to track the target more accurately. Similarly, in a scenario where the environment is highly cluttered, variable weighting can be used to give more weight to certain dimensions of the points to improve the accuracy of the clustering. The feedback mechanisms can be used to provide real-time feedback to the radar system about the performance of the clustering algorithm, allowing the system to make adjustments as necessary to optimize performance.

Figure 4:
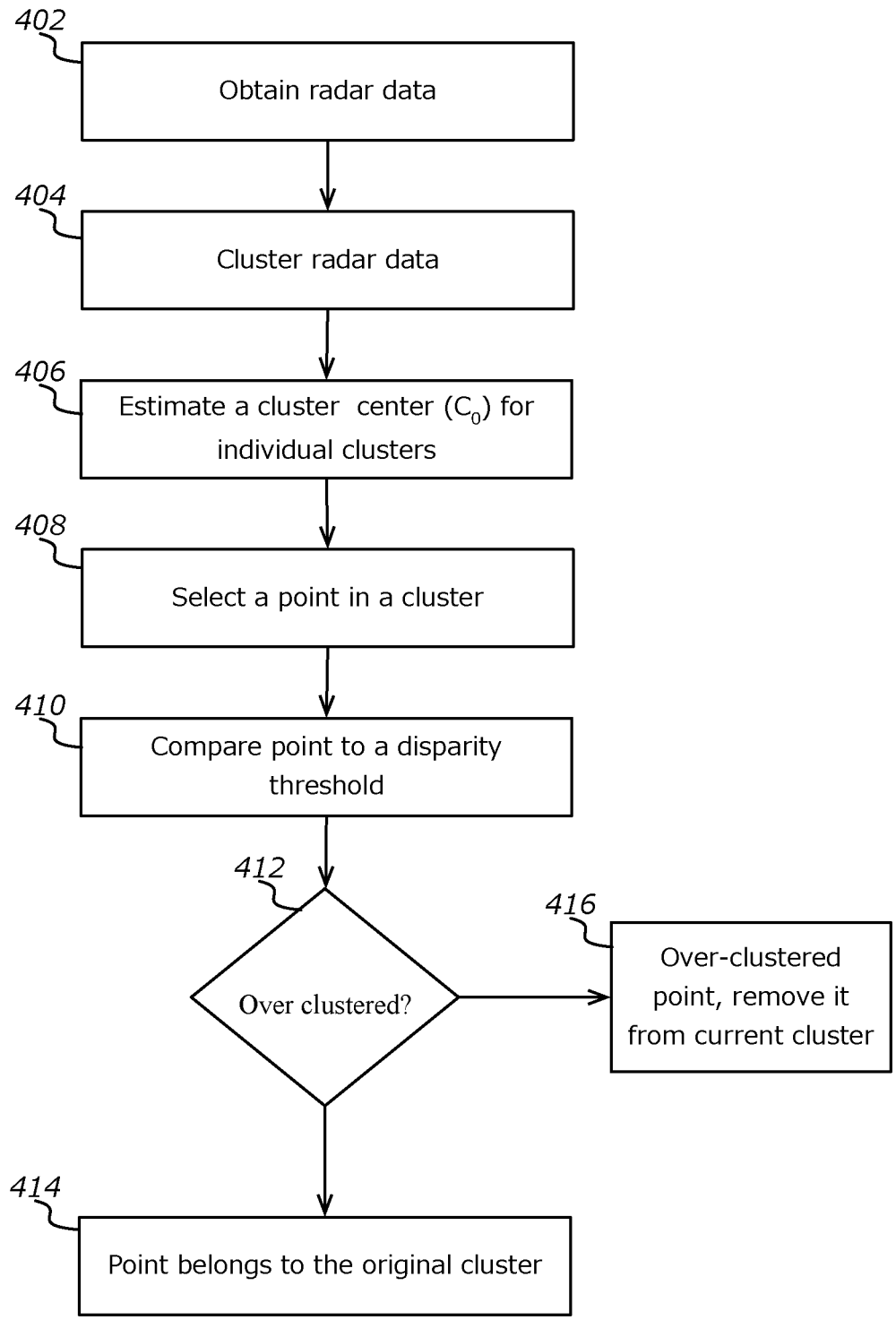
FIG. 4 illustrates an example flowchart of correcting over-clustering, in which aspects of the various embodiments can be implemented.

FIG. 4 illustrates an example process for determining whether a cluster has been over-clustered and segmenting the cluster, in which aspects of the various embodiments can be implemented. In this example, radar data is obtained 402. The radar data comprises points representing targets or objects detected by the radar system.

Upon obtaining radar data, the radar data may be clustered 404 in accordance with embodiments described herein. For example, in an embodiment, clusters can be formed based on clustering attributes such as range, azimuth angle, elevation angle, doppler, or any combination thereof. In another example, clusters may be formed based on coordinates and doppler, such as (x, y, z, doppler). A cluster may be identified by its center, for example, a cluster may have a weighted cluster center (e.g., $\alpha C_0$).

For individual clusters, a cluster center $C_0$ is estimated 406. In an embodiment, the cluster center may be estimated from techniques known in the art. In another embodiment, the cluster center may be a weighted cluster center ($\alpha C_0$) that is determined by using variable weighting of points based on a plurality of factors (e.g., range, doppler, signal-to-noise ratio (SNR), azimuth, elevation, and so forth).

A point is selected 408 in a cluster. The point is selected to evaluate its relationship to the cluster center and determine whether it has been over-clustered. The point selection can be done in various ways, depending on the specific implementation or algorithm being used. One possible method is sequential selection, where points within the cluster are selected in the order they were added to the cluster, or based on their index in the dataset. The algorithm iterates through the points one by one, evaluating their distance to the cluster center. Another approach is random selection, in which points are chosen randomly from the cluster. This method adds an element of randomness to the evaluation process, which might help avoid any bias introduced by the order of the data points. Alternatively, stratified selection can be employed, where points are selected based on their attribute values, such as range, doppler, or SNR. This method ensures that a representative sample of points with diverse attribute values is selected from the cluster. A hierarchical selection method can also be used, where the algorithm first selects a point with the highest or lowest attribute value (e.g., range, doppler) within the cluster. It then proceeds to select points that are hierarchically closer or further from the cluster center based on the chosen attribute.

The point is compared 410 with a disparity threshold. In an embodiment, the disparity threshold may include a figure of merit that is a value calculated based on previous scans. In other embodiments, the disparity threshold may be a predetermined value.

A determination is made 412 whether the point is an over clustered point.

In the situation the norm distance of the point from the weighted center $\alpha C_0$ is less than the disparity threshold, the point is determined 414 to belong to the original cluster (e.g., first cluster) and the point is considered to not experience over-clustering.

In the situation the norm distance of the point from the weighted center $\alpha C_0$ is higher than the disparity threshold, the point is determined to be an over-clustered point and is removed 416 from the cluster.

In an embodiment, the removed point can be used to create a new cluster (e.g., a second cluster). In another embodiment, the removed point can be appended to similar points which caused over-clustering of the original cluster.

Figure 5:
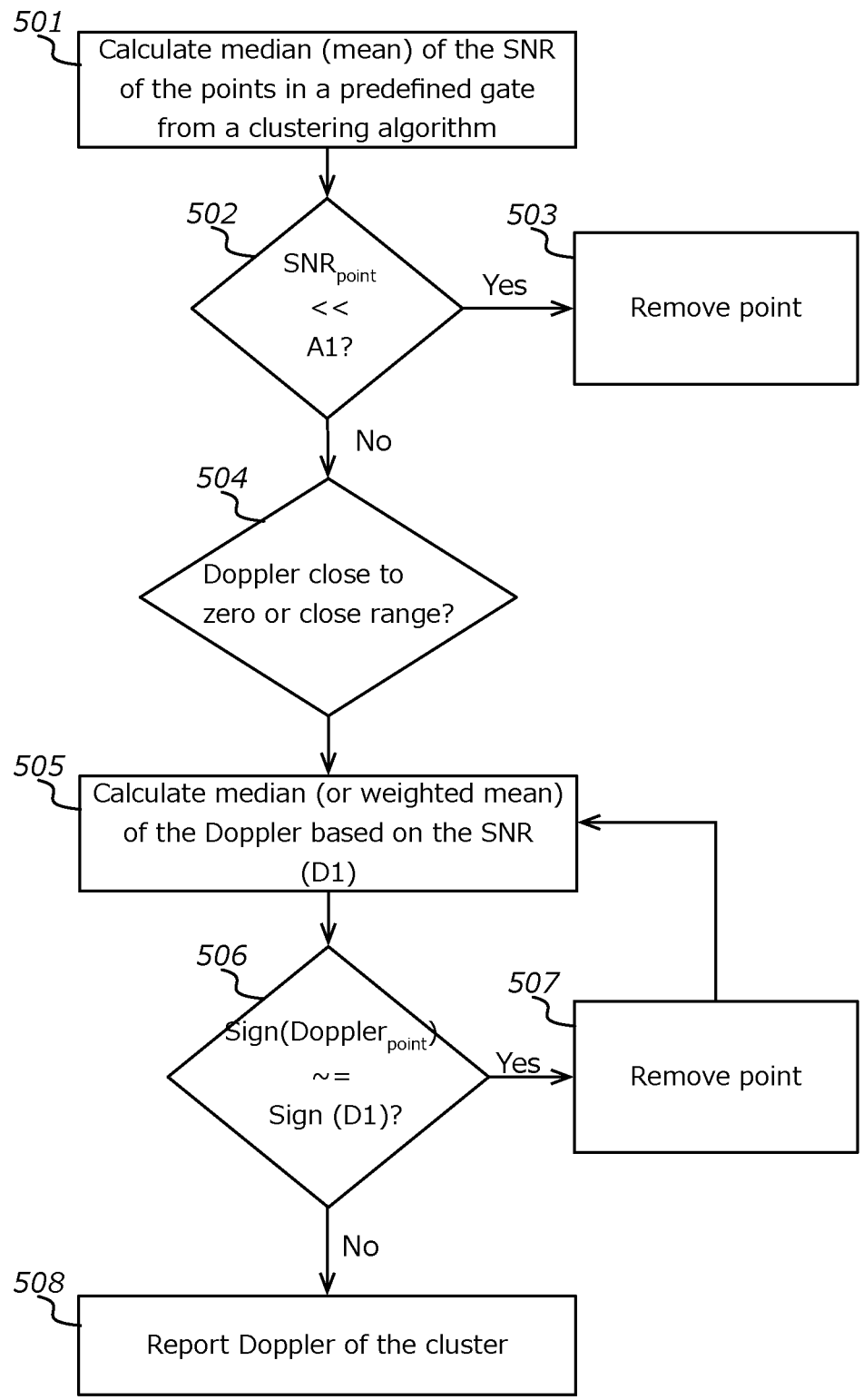
FIG. 5 illustrates an example flowchart of removing outlier points from a cluster, in which aspects of the various embodiments can be implemented.

FIG. 5 illustrates an example process for removing outlier points from a cluster, in which aspects of the various embodiments can be implemented. More specifically, FIG. 5 illustrates an example process for removing outlier points from a cluster based on the distance of the point to the cluster center and the determined clustering gate size, such as doppler gates or range gates. In this example, the radar data is clustered using a clustering algorithm, and the distance between each point and the cluster center is calculated. If the distance between a point and the center is higher than the determined clustering gate size, such as doppler gates or range gates, the point is considered an outlier and is removed from the cluster. This process is repeated for each cluster in the radar data, resulting in clusters with a reduced number of outlier points.

In this example, radar data is obtained and processed by, e.g., adaptive clustering system 120. The data is used to determine the points within the radar scene, which are then subjected to clustering using a clustering algorithm. Once the points are clustered in accordance with embodiments described herein, a median (or mean) (e.g., $A_1$) is calculated 502 of the signal-to-noise ratio (SNR) of the points in the cluster, which in certain embodiments may be performed by outlier identifier 226. In an embodiment, to calculate the median (or mean) of the SNR for a cluster, outlier identifier 226 collects the SNR values of all the points within the given cluster. For the median SNR calculation, the SNR values are sorted in ascending order. If the cluster contains an odd number of points, the median SNR is the middle value in the sorted list. If there is an even number of points, the median SNR is the average of the two middle values in the sorted list. On the other hand, when calculating the mean SNR, the sum of all the SNR values is determined, and then this sum is divided by the total number of points in the cluster to obtain the mean SNR value. Outlier identifier 226 uses either the median or mean SNR value, depending on the chosen method, to identify and remove outlier points based on the predetermined SNR difference threshold.

The SNR of individual targets is compared 502 with the calculated SNR.

In an embodiment, comparing individual SNR of targets can include determining a difference between an individual point SNR and the median (or mean) SNR. More specifically, comparing individual SNR of targets comprises calculating the absolute difference between the SNR value of each individual point and the median (or mean) SNR value of the cluster. The calculated difference can serve as a metric to assess the similarity or dissimilarity between the individual point's SNR and the overall SNR characteristics of the cluster. For example, in the situation a difference between a point's SNR and the median (or mean) SNR is significant, the point is considered an outlier and is removed 503 from the cluster. For example, a significant difference may comprise one that exceeds a predetermined SNR difference threshold. In an embodiment, the threshold can be set based on empirical data, domain knowledge, or through a learning process. In the situation the difference between a point's SNR and the median (or mean) SNR is less than the SNR difference threshold, the process proceeds to evaluate the Doppler information associated with the points to further refine the clustering.

In accordance with various embodiments, a problem which arises with clustering can involve incorrect clustering for targets that have a Doppler within a predefined Doppler threshold or at a distance less than the defined range threshold from the radar system, such as when the radar is stationary. These targets typically exhibit Doppler spread. Specifically, if these targets saturate the radar, this phenomenon is frequent. To address this, the approach for dealing with a moving radar platform is applied, but instead of comparing the Doppler sign (i.e., comparing with 0), the Doppler can be adjusted to generate an adjusted Doppler set to the Doppler less the platform velocity.

Specifically, a determination 504 is made whether the Doppler of a point falls within the predefined thresholds. More specifically, the median $D_1$ (or mean Doppler) may be calculated 505 based on the SNR of the clustered points. For each point in the cluster, the sign (e.g., positive or negative) of the point is compared 506 to the sign of the median value $D_1$. If the sign of the point is different from that of the median $D_1$ (or mean doppler), the point is considered an outlier and is removed 507 from the cluster. After several iterations of enhancing the quality of points inside each cluster, cluster will comprise of the remaining points (e.g., those which shared the same sign as that of the mean doppler).

The doppler of the final resulting cluster (e.g., trimmed of outlier points) is reported 508 or stored for further analysis or processing. The final cluster is obtained after removing the outlier points based on the determined gate size threshold or disparity threshold. The doppler information of the final cluster can be used for various applications such as tracking or identifying the target. The reporting or storing of the doppler information can be done in various ways, such as displaying on a screen, transmitting to another system or component, or storing in a memory device.

Figure 6:
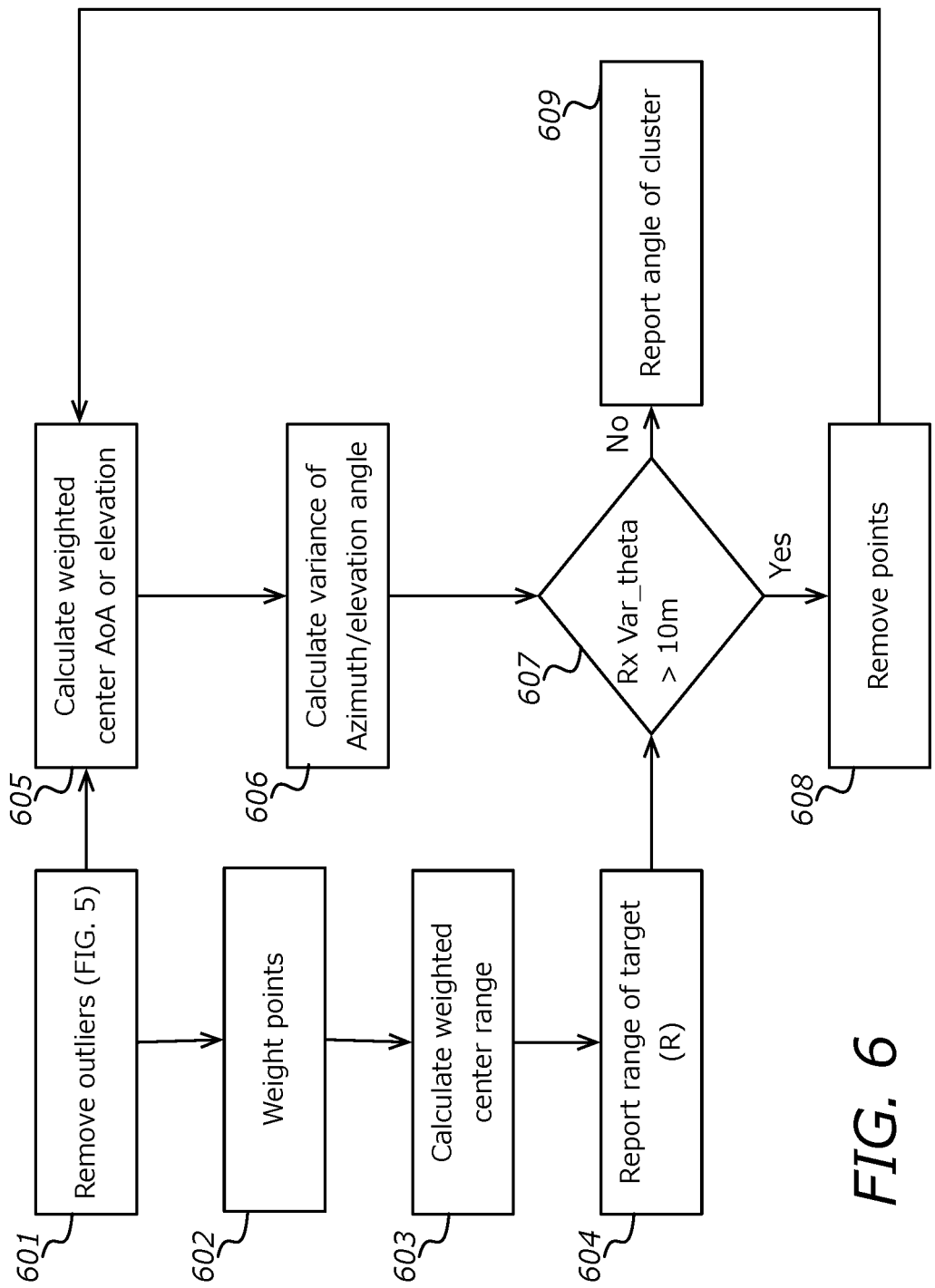
FIG. 6 illustrates an example flowchart of determining a center of a cluster, in which aspects of the various embodiments can be implemented.

FIG. 6 illustrates an example process for determining a center of a cluster, in which aspects of the various embodiments can be implemented. In this example, variable weighting can be used to determine a center of a cluster. In accordance with various embodiments, identifying an accurate cluster center provides several advantages that contribute to the effectiveness and interpretability of the clustering process. For example, accurate cluster centers enhance the overall quality of clustering, allowing for better separation between different clusters and ensuring that similar data points are grouped together. This results in more meaningful and reliable groupings, which are essential for informed decision-making and further data analysis. In another example, precise cluster centers help reduce the influence of noise and outliers in the dataset. By identifying the central tendencies of a cluster, irrelevant or extreme data points can be filtered out, preventing them from skewing the analysis. In yet another example, cluster centers can be used to describe the key characteristics of a group of data points, improving the interpretability of the underlying structure and relationships within the data. This aids in interpreting the results of clustering and effectively communicating the findings to others. In yet another example, representing a cluster with its center can significantly reduce the complexity of the dataset, especially when dealing with large amounts of data. This compressed representation allows for more efficient processing, storage, and retrieval of data while retaining the essential information. In yet another example, accurate cluster centers serve as a reference point for measuring similarity or distance between data points or clusters. This facilitates the comparison and contrasting of different clusters, enabling further analysis such as hierarchical clustering or classification tasks.

Continuing with FIG. 6, the process can identify a cluster center based on dimensions beyond spatial dimensions (e.g., x, y, z coordinates), for example, by range (relative to the radar), azimuth angle and/or elevation angle relative to the radar, doppler, a combination thereof, etc.

At step 601, points are removed (e.g., see FIG. 5) from the cluster. The range and azimuth and/or elevation angles of the cluster are determined. The doppler associated for each point in the cluster is examined. If the doppler is positive, the target is approaching the radar.

At step 602, points are weighted. For example, points with a positive doppler which have lower range (e.g., are closer to the radar) are given more weight. In accordance with an embodiment, when points have a positive Doppler, it indicates that the targets are approaching the radar. The closer the target is to the radar, the higher the potential for accurate measurements and stronger signals. Therefore, points with a positive Doppler and lower range (i.e., closer to the radar) are assigned more weight in the calculation of the cluster center. Points with a negative doppler indicate that the target is moving away from the radar. In this example, points with a negative doppler which have a higher range (e.g., are further away from the radar) are weighted less heavily. In a specific example, consider two points A and B within a cluster, both with positive Doppler values. Point A is at a range of 100 meters from the radar, while point B is at a range of 200 meters. Since point A is closer to the radar, it will be assigned a higher weight in the cluster center calculation compared to point B. This increased weight reflects the higher reliability and accuracy of the measurements associated with point A due to its closer proximity to the radar.

In accordance with an embodiment, the weight for each point in the cluster can be determined based on various factors, such as the Doppler value and range, as well as other factors like the SNR or other relevant attributes. In an embodiment, to determine the weight for each point, a weighting function or algorithm can be employed. The weighting function can take into account the Doppler value and the range of each point, with different weight assignments depending on whether the Doppler value is positive or negative. For points with a positive Doppler value (indicating targets approaching the radar), the weight increases as the range decreases, giving more importance to closer targets. A possible weighting function could be inversely proportional to the range, such as weight=k/range, where k is a constant, and range is the distance of the point from the radar. For points with a negative Doppler value (indicating targets moving away from the radar), the weight increases as the range increases, giving more importance to further targets. A possible weighting function could be directly proportional to the range, such as weight=k*range. In both cases, k can be adjusted to control the influence of range in the weight assignment. The weighting function can also be adapted to incorporate other factors like the SNR, azimuth, elevation, or other relevant attributes.

At step 603, the weighted center range (e.g., R) for points is calculated. In an embodiment, the updated weights from step 602, which take into account both Doppler and range, may be used to determine the weighted center range for the cluster. These weights are combined with the SNR values of each point to create a comprehensive weighting for each point in the cluster. In an embodiment, the comprehensive weighting is a measure that incorporates the influence of Doppler, range, and SNR for each point, providing a more accurate representation of the point's relevance within the cluster.

In an example, the process calculates a weighted center range (e.g., R) of all the points within a predefined gate from a clustering algorithm based on SNR. In an embodiment, a predefined gate refers to a specific region or set of points within the radar data that have been grouped together based on certain criteria, such as proximity or similarity in range, Doppler, or SNR. These predefined gates are used as the basis for the clustering algorithm to determine the clusters in the data.

The weighted center range can be determined by computing the weighted average range of all the points in the cluster, taking into account the comprehensive weighting for each point. To illustrate this step, consider a cluster with three points: A, B, and C. The Doppler and range-based weights from step 602 for each point are as follows: A (0.6), B (0.8), and C (0.5). The SNR values for the points are A (10), B (20), and C (15). The comprehensive weighting for each point can be calculated by multiplying the Doppler and range-based weights with the SNR values: A (0.6*10=6), B (0.8*20=16), and C (0.5*15=7.5).

The weighted center range (e.g., R) is then calculated by taking an average of the range values of all the points within the predefined gate, factoring in the new comprehensive weighting. For instance, if the ranges for points A, B, and C are 100 m, 200 m, and 150 m, respectively, the weighted center range can be calculated as ((6*100)+(16*200)+(7.5*150))/(6+16+7.5)=169.41 m.

At step 604, the range R of the target (e.g., cluster) is reported. In an embodiment, the range of the target provided to other systems or components within the radar system for further processing and analysis. For example, once the range R is determined for a particular cluster, it can be used to inform tracking algorithms, enabling them to more accurately track the movement of the target over time. In another example, the range R of a cluster could be used to inform target classification algorithms, which may rely on the range information to help differentiate between different types of targets, such as vehicles, pedestrians, or other objects.

As described, determining the center of a cluster can be based on the range and angel associated with a cluster. At step 605, the process calculates the average SNR-weighted angle of arrival (AoA) of the points inside the cluster. In accordance with an embodiment, this calculation is based on the angle values and the SNR of each point, which allows for a more accurate estimation of the center AoA. In an embodiment, to calculate the average SNR-weighted AoA, the AoA of each point is multiplied by its respective SNR, and the results are summed. The sum is then divided by the total sum of the SNR values for all points in the cluster:

In an embodiment, the weighted center AoA can be in azimuth, elevation, or both, depending on the specific application and the data available. For example, in a scenario where a radar system is capable of determining only the horizontal angle (azimuth) at which a target is detected, the weighted center AoA would be calculated solely for azimuth angles. In this instance, the process would account for the azimuth angles and SNR values of the points to find the average SNR-weighted azimuth angle for the cluster. Alternatively, in a situation where a radar system is designed to detect only the vertical angle (elevation) of a target, without providing information about the horizontal angle (azimuth), the weighted center AoA would be calculated based exclusively on elevation angles. The process would utilize the elevation angles and SNR values of the points to determine the average SNR-weighted elevation angle for the cluster. In embodiments where a radar system provides data on both azimuth and elevation angles, the weighted center AoA calculation would consider both dimensions. In such cases, the process would calculate separate average SNR-weighted azimuth and elevation angles using the respective angles and SNR values of the points.

At step 606, the process calculates the variance $var_\theta$ of the AoA of the points. In an embodiment, variance is a measure of the dispersion of the angles, indicating how spread out the AoA values are from the mean AoA. A high variance indicates that the points have a wide range of angles, while a low variance suggests that the angles are more closely clustered together At step 607, for each point, its range is multiplied by the variance, and the product is compared against a predetermined range threshold (e.g., 10 m). If the product is higher than the range threshold, the point is removed 608 from the cluster. The process iterates through the points, comparing each point's range-variance product against the range threshold.

At step 609, the resulting angle of the cluster is determined from the remaining points and reported. After the removal of points with range-variance products exceeding the predetermined range threshold, the remaining points in the cluster are used to determine the final angle of the cluster. For example, the process calculates the final average SNR-weighted Angle of Arrival (AoA) can be calculated based on the remaining points, considering their azimuth and elevation angles, as well as their respective SNR values. This final angle calculation provides a more accurate representation of the cluster's position and orientation, contributing to the effectiveness and interpretability of the clustering process. For example, in a radar system that provides both azimuth and elevation angle data, the process calculates separate average SNR-weighted azimuth and elevation angles for the remaining points in the cluster. The resulting angles provide a comprehensive representation of the cluster's orientation in both horizontal and vertical dimensions, which can be reported as the final angle of the cluster. In another example, for a radar system that provides only azimuth angle data, the process calculates the final average SNR-weighted azimuth angle for the remaining points in the cluster. This final azimuth angle offers a more precise representation of the cluster's horizontal orientation and can be reported as the final angle of the cluster.

FIG. 7 illustrates an example process for using adaptive gate sizing in clustering, in which aspects of the various embodiments can be implemented. As described herein, adaptive gate sizing in clustering enhances the effectiveness and accuracy of radar data processing by adjusting clustering parameters based on feedback information such as target characteristics, environmental conditions, and system constraints. In an embodiment, clustering parameters can refer to the variables and settings used to define and control the process of clustering data points. Clustering parameters can include, e.g., factors such as clustering gate sizes, weighting techniques, outlier removal thresholds, and other settings used to identify and group related data points.

In accordance with various embodiments, adaptive gate sizing can be utilized to fine tune clustering parameters. For example, based on feedback received from the environment and/or previous data (from previous scans), specific knobs can be tuned to improve effectiveness and accuracy of clustering further points from radar data. In an embodiment, knobs can correspond to various gates and their gate size, such as for doppler, range, azimuth angle, elevation angle, a combination thereof, etc. For example, for a doppler gate, the doppler gate size determines the size of the sample volume. The doppler gate can select doppler signals within a given time period, only allowing signals through only within the selected time. In other examples, range gates, azimuth angle gates, etc., can be used.

In an embodiment, the process uses feedback from various sources (e.g., from previous scans). Feedback can be received from the environmental map 701, tracking output (tracking parameters) 702, INS data 703, radar scan time 704, target types 705, and so forth.

In an embodiment, the environmental map 701 provides information about the surroundings, including stationary objects, terrain features, and known clutter sources, which can be utilized to enhance the clustering process by considering the impact of such factors on radar data.

In an embodiment, tracking output 702 refers to the tracking parameters generated by tracking algorithms that process radar data to monitor the positions, velocities, and trajectories of detected targets. In accordance with various embodiments, this information can be used to adjust clustering parameters to improve target separation and maintain consistent target tracking.

In an embodiment, inertial Navigation System (INS) data 703 provides information about the position, velocity, and orientation of the radar system itself, such as an ego vehicle, by integrating data from accelerometers, gyroscopes, and other sensors. In an embodiment, this data can help refine the clustering process by accounting for the radar system's motion and changes in orientation.

In an embodiment, radar scan time 704 refers to the interval between consecutive radar scans, which can affect the data quality and temporal resolution of radar measurements. In accordance with various embodiments, by considering the radar scan time, the clustering process can adapt to the varying data quality and target motion characteristics.

In an embodiment, target types 705 refer to the different classes of objects that the radar system aims to detect and track, such as vehicles, pedestrians, or drones. In accordance with various embodiments, by accounting for the specific properties and behaviors of different target types, the clustering process can be tailored to improve the detection and tracking performance for the targets of interest in various scenarios.

Based on the feedback, the process can define 706 the various gate sizes accordingly. For instance, tracking output 702 can be used to track two objects (e.g., targets), where one tracked target closely approaches the other tracked target. Based on the tracking output 702, it can be assumed that the two targets have differing Doppler values. With this assumption, the gate size in the Doppler dimension can be decreased, while the gate sizes in range and azimuth are maintained to ensure that these two targets will be separated upon clustering of the points. Feedback from the map 701 and/or previous scans of the radar can yield prior data of background clutter and the location of points contributing to the clutter. These points can be removed prior to clustering.

In another example, feedback from INS data 703 can be used to estimate the location and maneuverability of a target, for example, an ego car. Based on the INS location of the target, the process can adaptively change the clustering gate size in various aspects (e.g., by range, azimuth, elevation, Doppler, etc., as appropriate). Radar scan time 704 that is frequent (e.g., performing scans quickly, such as every less than 2 msec) may result in data where the target (e.g., an ego car, etc.) is almost fixed, with less variation and/or smearing over range and Doppler, as opposed to when radar scan time 704 is less frequent (e.g., performing scans less quickly, such as every 200 msec). Thus, radar scan time can affect the data quality of data received, which in turn affects which gate sizes may be adjusted.

At step 707, after defining the appropriate gate sizes for range, azimuth, elevation, doppler, or any other relevant dimension, points are collected through the gates and clustered using a connected graph with a minimum point requirement. In an embodiment, minimum point requirement ensures that only meaningful clusters with a sufficient number of points are formed, eliminating small, noisy clusters. The clustering can be performed using any suitable technique known in the art for finding connected components in a graph. One such technique is the Depth-First Search (DFS) algorithm. The DFS algorithm starts at an arbitrary data point and explores as far as possible along each branch before backtracking. The algorithm keeps track of visited nodes and continues until all nodes in the connected component are visited. This process is repeated for each unvisited node in the graph until all connected components are identified.

The center of each cluster is determined 708. In an embodiment, the center may be determined based on techniques know in the art. In another embodiment, the center may be determined by variable weighting of dimensions beyond spatial dimensions, for example, azimuth, elevation, range, doppler, etc., as described in further detail in FIG. 6.

The process calculates 709 the distance between each of the points in the cluster and the center. In an example, to calculate the distance between each point and the center, a suitable distance metric is employed. Common distance metrics include Euclidean distance, Manhattan distance, or Mahalanobis distance, among others. The choice of the distance metric may depend on the specific application and the nature of the data. For example, using the Euclidean distance, the process calculates the square root of the sum of the squared differences between the coordinates of each point and the coordinates of the center. If the clustering is based on multiple dimensions, such as range, azimuth, elevation, and doppler, the distance calculation will consider the differences in all relevant dimensions. Once the distances between each point in the cluster and the center are calculated, these values can be used in subsequent steps to refine the clustering, such as removing outliers or re-clustering the remaining points.

The distance is compared 710 to a determined clustering gate size. In an embodiment, the clustering gate size serves as a threshold to assess whether a point truly belongs to the cluster or not. This threshold can be defined based on domain knowledge, feedback from the environment, or data-driven techniques, among other factors. If the distance between a point and the center is higher than the determined clustering gate size, it is considered that the point does not belong to the cluster. Consequently, the point is removed from the cluster. This step helps improve the clustering quality by filtering out potential outliers or noise that may adversely affect the cluster's accuracy and interpretability.

After removing the non-conforming points, the process proceeds to step 711, where the remaining points are re-clustered into a new cluster. Re-clustering can involve applying the same clustering technique used in step 707 or other suitable methods. The purpose of re-clustering is to refine the existing cluster by considering only the most representative points, which can lead to a more accurate and reliable representation of the underlying structure. In an embodiment, the process can determine a new center for the new cluster. This new center can be calculated using the same method as in step 708 or other appropriate techniques.

The updated clusters resulting from the re-clustering process can be used in conjunction with other processing steps, such as adaptive gate sizing, variable weighting, and feedback mechanisms, to optimize the overall performance of the radar system in various scenarios and environments.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a JAVA virtual machine or equivalent, or files containing higher level code that may be executed by the computer using an interpreter (for example, scripts written in Python, Perl, Ruby, Groovy, or any other scripting language).

In some embodiments, systems may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

In some embodiments, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments.

Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A radar system for improved detection of targets in an environment by clustering the targets represented in radar data, comprising:
   a radar transmitter configured to emit radar signals;
   a radar receiver configured to collect reflected radar signals from the targets within the environment;
   a processor; and
   a memory device including instructions that, when executed by the processor, enables the radar system to:
      obtain the radar data, the radar data including points representing the targets in the environment, individual points comprising multi-dimensional target attributes;
      determine clustering gate sizes based on feedback information;
      determine a plurality of clusters, individual clusters comprising points based on at least one adjusted gate size;
      determine respective cluster centers for the plurality of clusters;
      remove points from respective clusters exceeding one of a gate size threshold or a disparity threshold;
      re-cluster remaining points into a new cluster;
      thereby improving the detection of the targets in the environment by reducing over-clustering or under-clustering of the radar data.

2. The radar system of claim 1, wherein the instructions, when executed by the processor to re-cluster the remaining points, further enables the radar system to:
   determine a new center for the remaining points and re-cluster the remaining points based on at least one of the new center, updated gate sizing, updated weights, or updated feedback information.

3. The radar system of claim 1, wherein the instructions, when executed by the processor, further enables the radar system to:
   calculate a new center for the new cluster based on at least one of doppler information, signal-to-noise ratio information, environmental conditions, or system constraints.

4. The radar system of claim 1, wherein the instructions, when executed by the processor, further enables the radar system to:
   determine a new cluster using the removed points and associate the new cluster with the remaining points.

5. The radar system of claim 1, wherein the instructions, when executed by the processor, further enables the radar system to:
   for individual clusters,
      calculate a median signal to noise ratio (SNR) of points in a cluster;
      select a point in the cluster;
      determine a SNR of the point is less than the median SNR;
      determine a doppler of the point is within a predetermined range;
      calculate a median doppler of the points in the cluster;
      determine a sign of the doppler of the point does not match a sign of the median doppler; and
      remove the point.

6. The radar system of claim 1, wherein the instructions, when executed by the processor, further enables the radar system to:
   cluster points in a cluster based on a predefined gate based on signal to noise ratio (SNR);
   assign a predetermined weight to points in the cluster with a range below a predetermined threshold and positive doppler; and
   calculate a weighted center based on an average range of the points in the cluster.

7. The radar system of claim 1, wherein the instructions, when executed by the processor, further enables the radar system to:
   cluster points in a cluster based on a predefined gate size based on SNR;
   assign a second predetermined weight to the points in the cluster with a range above a second predetermined threshold and negative doppler; and
   calculate a weighted center based on an average angle of arrival of the points in the cluster.

8. The radar system of claim 1, wherein the instructions, when executed by the processor, further enables the radar system to:
   cluster points in a cluster based on a predefined gate based on SNR;
   associate a third predetermined weight to the points in the cluster with an angle of arrival above a third predetermined threshold; and
   calculate a weighted center based on an average angle of arrival of the points in the cluster.

9. The radar system of claim 8, further comprising:
   calculate a variance of the angle of arrival of the points in the cluster;
   select a point in the cluster;
   determine a multiplier of the variance with a range of the point exceeds a predetermined threshold; and
   remove the point.

10. The radar system of claim 1, further comprising:
    receive data from at least one of a map, tracking algorithm output, inertial navigation system (INS), radar scan time, or target type;
    define a clustering gate size in at least one of range, azimuth, elevation, or doppler; and
    cluster a plurality of points based on the defined clustering gate size.

11. The radar system of claim 1, wherein the multi-dimensional target attributes comprise at least one of range information, Doppler information, azimuth angle information, elevation angle information, and signal-to-noise ratio (SNR) information, and wherein feedback information comprises at least one of target characteristics, environmental conditions, or system constraints.

12. A computer-implemented method, performed using a radar system, for improved detection of targets in an environment by clustering the targets represented in radar data, comprising:
    obtaining the radar data from the radar system, the radar data including points representing the targets in the environment, individual points comprising multi-dimensional target attributes;
    determining clustering gate sizes based on feedback information;
    determining a plurality of clusters, individual clusters comprising points based on at least one adjusted gate size;
    determining respective cluster centers for the plurality of clusters;
    removing points from respective clusters exceeding one of a gate size threshold or a disparity threshold;
    re-clustering remaining points into a new cluster;

thereby improving the detection of the targets in the environment by reducing over-clustering or under-clustering of the radar data.

13. The computer-implemented method of claim 12, further comprising:
determining a new center for the remaining points and re-cluster the remaining points based on at least one of the new center, updated gate sizing, updated weights, or updated feedback information.

14. The computer-implemented method of claim 12, further comprising:
calculating a new center for the new cluster based on at least one of doppler information, signal-to-noise ratio information, environmental conditions, or system constraints.

15. The computer-implemented method of claim 12, further comprising:
determining a new cluster using the removed points and associate the new cluster with the remaining points.

16. The computer-implemented method of claim 12, further comprising:
for individual clusters:
calculating a median signal to noise ratio (SNR) of points in a cluster;
selecting a point in the cluster;
determining a SNR of the point is less than the median SNR;
determining a doppler of the point is within a predetermined range;
calculating a median doppler of the points in the cluster;
determining a sign of the doppler of the point does not match a sign of the median doppler; and
removing the point.

17. The computer-implemented method of claim 12, further comprising:
clustering points in a cluster based on a predefined gate based on signal to noise ratio (SNR);
assigning a predetermined weight to points in the cluster with a range below a predetermined threshold and positive doppler; and
calculating a weighted center based on an average range of the points in the cluster.

18. The computer-implemented method of claim 12, further comprising:
clustering points in a cluster based on a predefined gate size based on SNR;
assigning a second predetermined weight to the points in the cluster with a range above a second predetermined threshold and negative doppler; and
calculating a weighted center based on an average angle of arrival of the points in the cluster.

19. The computer-implemented method of claim 12, further comprising:
clustering points in a cluster based on a predefined gate based on SNR;
assigning a third predetermined weight to the points in the cluster with an angle of arrival above a third predetermined threshold;
calculating a weighted center based on an average angle of arrival of the points in the cluster;
calculating a variance of the angle of arrival of the points in the cluster;
selecting a point in the cluster;
determining a multiplier of the variance with a range of the point exceeds a predetermined threshold; and
removing the point.

20. A non-transitory computer readable storage medium storing instructions for improved detection of targets in an environment by clustering the targets represented in radar data, wherein, when the instructions executed by at least one processor of a radar system, causes the radar system to:
obtain the radar data, the radar data including points representing the targets in the environment, individual points comprising multi-dimensional target attributes;
determine clustering gate sizes based on feedback information;
determine a plurality of clusters, individual clusters comprising points based on at least one adjusted gate size;
determine respective cluster centers for the plurality of clusters;
remove points from respective clusters exceeding one of a gate size threshold or a disparity threshold;
re-cluster remaining points into a new cluster;
thereby improving the detection of the targets in the environment by reducing over-clustering or under-clustering of the radar data.

* * * * *